Jan. 3, 1967　　　L. R. SPARROW ETAL　　　3,296,505
GLASS-BONDED MICA ENCAPSULATED TANTALUM CAPACITOR
Filed June 24, 1964

INVENTORS
JERRY BRAIMAN
LAWRENCE R. SPARROW
BY
ATTORNEY

United States Patent Office 3,296,505
Patented Jan. 3, 1967

3,296,505
GLASS-BONDED MICA ENCAPSULATED
TANTALUM CAPACITOR
Lawrence Robert Sparrow and Jerry Braiman, Indianapolis, Ind., assignors to P. R. Mallory & Co., Inc., Indianapolis, Ind., a corporation of Delaware
Filed June 24, 1964, Ser. No. 377,639
10 Claims. (Cl. 317—230)

The present invention relates to solid electrolytic capacitors and more particularly relates to means and methods for providing a hermetic seal for solid electrolytic capacitors by encapsulation.

Solid tantalum capacitors are known to be moisture sensitive, and many applications require the capacitors to be hermetically sealed in order to obtain high accuracy and good reproducibility. It is currently known in the art to provide hermetic seals for cylindrical solid tantalum capacitors by soldering a tantalum anode into a metal case, said case serving as a cathode. A preformed glass or ceramic to metal seal is slipped over the anode lead and soldered to the case and the anode lead. There are further means known to provide hermetic seals for non-cylindrical solid tantalum capacitors, however, there are problems in reproducibility. While the current means provides a satisfactory seal for cylindrical capacitors, and a fair hermetic seal for noncylindrical solid tantalum capacitors, a long standing need has existed for means and methods of economically producing a hermetically sealed cylindrical solid tantalum capacitor, and further to provide good hermetic seals for noncylindrical solid tantalum capacitors.

It is therefore an object of the present invention to provide a novel and economical encapsulated tantalum capacitor.

It is an object of the present invention to provide a one step molding operation for hermetically sealing cylindrical and noncylindrical solid tantalum capacitors.

It is an object of the present invention to provide a hermetically sealed solid tantalum capacitor having improved thermal characteristics.

The present invention in another of its aspects, relates to novel features of the instrumentalitites described herein for teaching the principal object of the invention and to the novel principles employed in the instrumentalities whether or not these features and principles may be used in the said objects and/or in the said field.

Other objects and advantages of the present invention will become apparent from the following description considered in conjunction with the accompanying figures of the drawings and wherein like reference characters describe elements of similar functions therein, and wherein the scope of the invention is defined by the appended claims.

Generally speaking, the present invention provides the means and methods for hermetically sealing a solid tantalum capacitor with glass-bonded mica in a one-step molding operation. Theoretically, tantalum capacitors cannot withstand the temperatures used in molding glass-bonded mica, and prior attempts have been made to utilize current plastic technology. However, it is not possible to obtain hermetic seals with plastic alone. The present invention consists of coating the tantalum anode with a conductive material capable of withstanding molding temperatures which serves as the cathode, attaching the cathode lead, with any material capable of withstanding molding temperature, placing the capacitor into a suitable mold cavity and molding the capacitor with glass-bonded mica. This process simplifies the obtaining of hermetic seals, thus substantially lowering production costs. It further provides a solid tantalum capacitor with improved thermal characteristics, and a superior hermetic seal.

Figure 1:
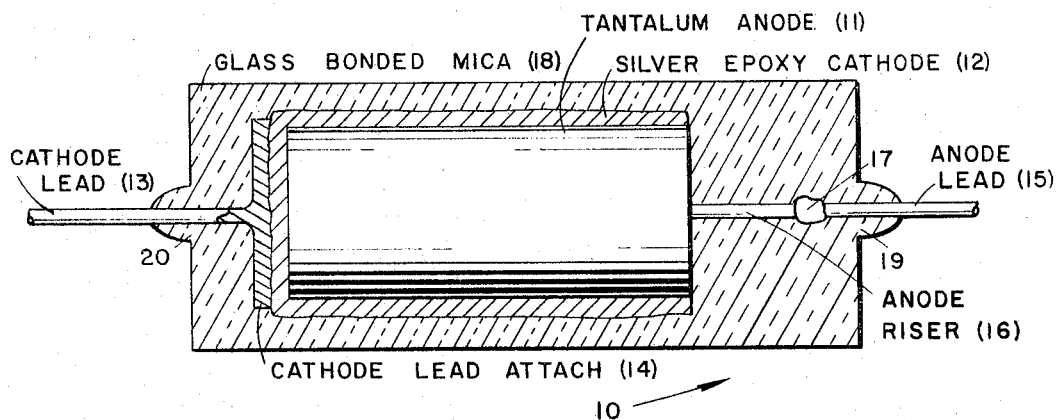
FIGURE 1 is a sectional view of the glass-bonded mica tantalum capacitor.

FIGURE 1 is a sectional view of the glass-bonded mica solid tantalum capacitor 10 wherein the tantalum anode 11 is coated with a conductive thermosetting material such as silver epoxy 12 which serves as the cathode. Cathode lead 13 is attached to cathode 12 at point 14 by epoxy 12, and anode lead 15 is attached to anode riser 16 at weld 17. Capacitor 10 is then placed in a suitable mold cavity and is molded with glass-bonded mica. End projections 19 and 20 further insure the seal.

Figure 2:
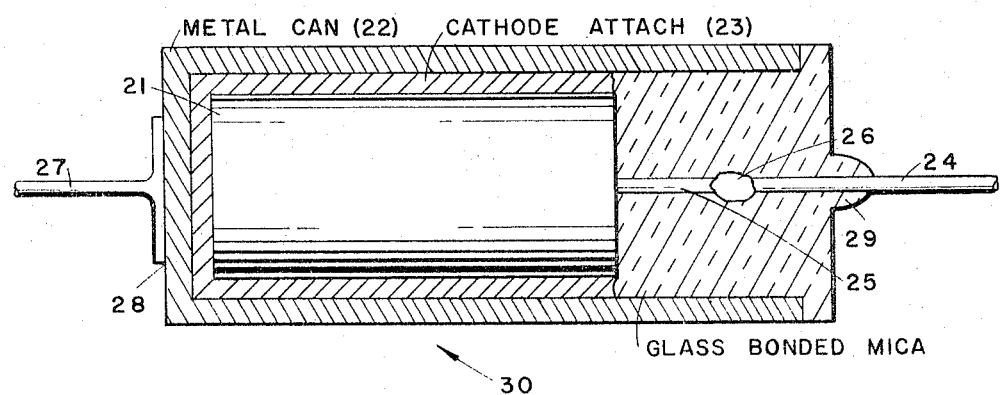
FIGURE 2 is a sectional view of a tantalum capacitor with a glass-bonded mica end seal.

FIGURE 2 is a sectional view of modified embodiment of the present invention wherein tantalum anode is bonded to the cathode can 22 by a layer of a conductive therosetting material such as silver epoxy 23. Anode lead 24 is welded to anode riser at point 26, and cathode lead is attached to cathode can 22 at point 28. A glass-bonded mica end seal 29 is then molded thus providing a hermetic seal for capacitor 30.

In the molding operation, any moldable glass or ceramic which will mold as a nonpermeable material can be used, however, most ceramics require sintering after they are molded. Glass bonded mica is preferable as it does not require post sintering. This process can also be utilized for molding solid aluminum, zirconium and the like capacitors.

The encapsulated capacitor of the present invention as herein described is merely illustrative and not exhaustive in scope. For instance, the method of attaching the cathode lead may be accomplished by any material which will withstand the molding conditions without melting and flowing. This includes spray metals having a sufficiently high melting point such as bronze, and welding the cathode lead thereto. Although silver epoxy was used as an illustrative example for the cathode, any thermosetting conductive material which will withstand molding conditions may be used. Further, while the drawings illustrate a cylindrical capacitor, this method is particularly applicable to any noncylindrical units as rectangular units. It is further applicable to solid capacitors consisting of the group including titanium, tantalum, zirconium, aluminum and niobium. Since many widely different embodiments of the invention may be made without departing from the scope thereof which will be readily apparent to those skilled in the art, it is intended that all matter contained in the above description and shown in the accompanying drawings shall be interposed as illustrative and not in a limited sense. I consider all of these variations and modifications to be within the foregoing description and defined by the appended claims.

Having thus described our invention,

We claim:

1. An electrolytic device comprising an anode of film forming metal, said anode having an extremity including an anode riser, a dielectric film formed on said anode, a solid layer of electrolyte overlying said dielectric film, a cathode layer of electrically conductive thermosetting material disposed on and substantially enclosing said electrolyte layer, a mass of glass intimately molded about said cathode layer hermetically sealing said device within a single, unitary encapsulated body thereof, with a cathode leading projecting from said cathode layer and an anode lead projecting from said anode riser.

2. An electrolytic device comprising an anode of film forming metal, said anode having an extremity including an anode riser, a dielectric film formed on said anode, a solid layer of electrolyte overlying said dielectric film, a cathode layer of electrically conductive thermosetting material disposed on and substantially surrounding said electrolyte layer, a mass of glass-bonded mica intimately molded about said cathode layer hermetically sealing said device within a single, unitary encapsulated body thereof, with a cathode lead projecting from said cathode layer and an anode lead projecting from said anode riser.

3. An electrolytic device comprising an anode of film forming metal selected from the group consisting of titanium, tantalum, zirconium, aluminum and niobium, said anode having an extremity including an anode riser, a dielectric film formed on said anode, a solid layer of electrolyte overlying said dielectric film, a cathode layer of electrically conductive thermosetting material disposed on and substantially surrounding said electrolyte layer, a mass of glass-bonded mica intimately molded about said cathode layer hermetically sealing said device within a single, unitary encapsulated body thereof, with a cathode lead projecting from said cathode layer and an anode lead projecting from said anode riser.

4. An electrolytic device comprising an anode of film forming metal selected from the group consisting of titanium, tantalum, zirconium, aluminum and niobium, said anode having an extremity including an anode riser, a dielectric film formed on said anode, a solid layer of electrolyte overlying said dielectric film, a cathode layer of electrically conductive thermosetting silver epoxy disposed on and substantially surrounding said electrolyte layer, a mass of glass-bonded mica intimately molded about said cathode layer hermetically sealing said device within a single, unitary encapsulated body thereof, with a cathode lead projecting from said cathode layer and an anode lead projecting from said anode riser.

5. An electrolytic device comprising a cylindrical anode of film forming metal selected from the group consisting of titanium, tantalum, zirconium, aluminum and niobium, said anode having one extremity including an anode riser, a dielectric film formed on said anode, a solid layer of electrolyte overlying said dielectric film, a cathode layer of electrically conductive thermosetting material disposed on and substantially surrounding said electrolyte layer overlying said dielectric film on the curved periphery and the second extremity of said cylindrical anode, a mass of glass-bonded mica intimately molded about said cathode layer hermetically sealing said device within a single, unitary encapsulated body thereof, with a cathode lead projecting from said cathode layer and an anode lead projecting from said anode riser.

6. An electrolytic device comprising an anode of film forming metal selected from the group consisting of titanium, tantalum, zirconium, aluminum and niobium, said anode having an extremity including an anode riser, a dielectric film formed on said anode, a solid layer of electrolyte overlying said dielectric film, a cathode layer of electrically conductive thermosetting silver epoxy disposed on and substantially surrounding said electrolyte layer, a mass of glass-bonded mica intimately molded about said cathode hermetically sealing said device within a single, unitary encapsulated body thereof, with a cathode lead projecting from said cathode layer and extending through said glass-bonded mica an anode lead projecting from said anode riser and extending through said glass-bonded mica, an end projection of glass-bonded mica surrounding a determined length of said cathode lead and of said anode lead further insuring said hermetic seal.

7. An electrolytic device comprising a porous anode of film forming metal, said anode having an extremity including an anode riser, said anode having a dielectric film formed thereon, a solid layer of electrolyte disposed on said dielectric film, a cathode layer of electrically conductive thermosetting material disposed on and substantially surrounding said layer of electrolyte, an electrically conductive can having an open end, said anode including said layers disposed within said can with said cathode layer in contact therewith forming a cathode connection, and a mass of glass-bonded mica intimately molded about said cathode layer hermetically sealing the open end of said can with an anode lead projecting from said anode riser.

8. An electrolytic device comprising a porous anode of film forming metal selected from the group consisting of titanium, tantalum, zirconium, aluminum and niobium, said anode having an extremity including an anode riser, said anode having a dielectric film formed thereon, a solid layer of electrolyte disposed on said dielectric film, a cathode layer of electrically conductive thermosetting material disposed on and substantially surrounding said layer of electrolyte, an electrically conductive can having an open end, said anode including said layers disposed within said can with said cathode layer in contact therewith forming a cathode connection, and a mass of glass-bonded mica intimately molded about said cathode layer hermetically sealing the open end of said can with an anode lead projecting from said anode riser.

9. An electrolytic device comprising a porous anode of film forming metal selected from the group consisting of titanium, tantalum, zirconium, aluminum and niobium, said anode having an extremity including an anode riser, said anode having a dielectric film formed thereon, a solid layer of electrolyte disposed on said dielectric film, a cathode layer of electrically conductive thermosetting silver epoxy disposed on and substantially surrounding said layer of electrolyte, an electrically conductive can having an open end, said anode including said layers disposed within said can with said cathode layer in contact therewith forming a cathode connection, and a mass of glass-bonded mica intimately molded about said cathode layer hermetically sealing the open end of said can with an anode lead projecting from said anode riser.

10. An electrolytic device comprising a porous anode of film forming metal selected from the group consisting of titanium, tantalum, zirconium, aluminum and niobium, said anode having an extremity including an anode riser, said anode having a dielectric film formed thereon, a solid layer of electrolyte disposed on said dielectric film, a cathode layer of electrically conductive thermosetting material disposed on and substantially surrounding said layer of electrolyte, an electrically conductive can having an open end and a closed end, a cathode lead projecting from said closed end of said can, said anode including said layers disposed within said can with said cathode layer in contact therewith forming a cathode connection, and a mass of glass-bonded mica intimately molded about said cathode layer hermetically sealing the open end of said can with an anode lead projecting from said anode riser and extending through said glass-bonded mica, and an end projection of glass-bonded mica surrounding a determined length of said anode lead further insuring said hermetic seal.

References Cited by the Examiner

UNITED STATES PATENTS

| 3,144,318 | 8/1964 | Bruen et al. | 65—18 |
| 3,206,658 | 9/1965 | Markarian | 317—230 |
| 3,255,395 | 6/1966 | Fabicius | 317—258 |

JAMES D. KALLAM, *Primary Examiner.*